United States Patent
Yang et al.

(10) Patent No.: US 9,999,037 B2
(45) Date of Patent: Jun. 12, 2018

(54) METHODS AND APPARATUS FOR ADJUSTING FLOW RATE OF TRANSMISSIONS RECEIVED BY A DEVICE

(71) Applicant: QUALCOMM Incorporated, San Diego, CA (US)

(72) Inventors: Yue Yang, San Diego, CA (US); Feilu Liu, San Diego, CA (US); Aziz Gholmieh, Del Mar, CA (US); Alexei Yurievitch Gorokhov, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 15/080,296

(22) Filed: Mar. 24, 2016

(65) Prior Publication Data
US 2016/0337072 A1 Nov. 17, 2016

Related U.S. Application Data

(60) Provisional application No. 62/162,605, filed on May 15, 2015.

(51) Int. Cl.
| | | |
|---|---|---|
| *H04W 4/00* | (2018.01) | |
| *H04W 72/04* | (2009.01) | |
| *H04L 1/16* | (2006.01) | |
| *H04L 1/00* | (2006.01) | |

(52) U.S. Cl.
CPC ......... *H04W 72/042* (2013.01); *H04L 1/0026* (2013.01); *H04L 1/0035* (2013.01); *H04L 1/1607* (2013.01); *H04W 72/0413* (2013.01); *H04L 1/0022* (2013.01)

(58) Field of Classification Search
None
See application file for complete search history.

(56) References Cited

U.S. PATENT DOCUMENTS

| | | | |
|---|---|---|---|
| 8,175,030 B2 * | 5/2012 | Terry | H04L 47/10 370/229 |
| 8,565,682 B1 | 10/2013 | Gomadam et al. | |
| 2005/0143084 A1 | 6/2005 | Cheng et al. | |
| 2009/0215442 A1 | 8/2009 | Lindoff et al. | |
| 2009/0307554 A1 * | 12/2009 | Marinier | H04L 1/1812 714/748 |

(Continued)

FOREIGN PATENT DOCUMENTS

EP 2413629 A1 2/2012

OTHER PUBLICATIONS

International Search Report and Written Opinion—PCT/US2016/024172—ISA/EPO—dated Jun. 17, 2016.

*Primary Examiner* — Minh-Trang Nguyen
(74) *Attorney, Agent, or Firm* — Patterson & Sheridan, LLP

(57) ABSTRACT

Certain aspects of the present disclosure relate to methods and apparatus for adjusting flow rate of transmissions received at a device. A user equipment (UE) determines, in response to detecting a trigger condition, a proposal to adjust feedback provided to a base station (BS) in order to adjust a flow rate of transmissions received at the UE from the BS. The UE adjusts the feedback based on the proposal and at least one additional condition and transmits the adjusted feedback to the BS.

30 Claims, 12 Drawing Sheets

(56) References Cited

U.S. PATENT DOCUMENTS

| | | | |
|---|---|---|---|
| 2012/0147750 A1* | 6/2012 | Pelletier | H04W 28/02 |
| | | | 370/235 |
| 2013/0114455 A1 | 5/2013 | Yoo et al. | |
| 2014/0334414 A1 | 11/2014 | Englund et al. | |
| 2014/0362695 A1 | 12/2014 | Ho et al. | |
| 2015/0058376 A1* | 2/2015 | Soshin | G06F 17/30292 |
| | | | 707/803 |
| 2016/0103717 A1* | 4/2016 | Dettori | G06F 9/45558 |
| | | | 719/318 |

\* cited by examiner

METHODS AND APPARATUS FOR ADJUSTING FLOW RATE OF TRANSMISSIONS RECEIVED BY A DEVICE

CLAIM OF PRIORITY UNDER 35 U.S.C. § 119

The present Application for Patent claims priority to U.S. Provisional Application No. 62/162,605, entitled "METHODS AND APPARATUS FOR ADJUSTING FLOW RATE OF TRANSMISSIONS RECEIVED BY A DEVICE" filed on May 15, 2015, and assigned to the assignee hereof and hereby expressly incorporated by reference herein.

BACKGROUND

Field

The present disclosure relates generally to wireless communication, and more particularly, to methods and apparatus for adjusting flow rate of transmissions received by a device.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally includes determining, in response to detecting a trigger condition, a proposal to adjust feedback provided to a base station (BS) in order to adjust a flow rate of transmissions received at the UE from the BS, adjusting the feedback based on the proposal and at least one additional condition, and transmitting the adjusted feedback to the BS.

Certain aspects of the present disclosure provide an apparatus for wireless communications by a user equipment (UE). The apparatus generally includes means for determining, in response to detecting a trigger condition, a proposal to adjust feedback provided to a base station (BS) in order to adjust a flow rate of transmissions received at the UE from the BS, means for adjusting the feedback based on the proposal and at least one additional condition, and means for transmitting the adjusted feedback to the BS.

Certain aspects of the present disclosure provide a method for wireless communications by a user equipment (UE). The method generally includes adjusting feedback provided to a base station (BS), based on a comparison of an instantaneous throughput corresponding to received downlink (DL) transmissions compared to a desired throughput and based on a determination of a channel quality indicator (CQI) offset applied by the base station, in order to adjust a flow rate of transmissions received at the UE from the BS, and transmitting the adjusted feedback to the BS.

Certain aspects of the present disclosure provide an apparatus for wireless communications by a user equipment (UE). The apparatus generally includes means for adjusting feedback provided to a base station (BS), based on a comparison of an instantaneous throughput corresponding to received downlink (DL) transmissions compared to a desired throughput and based on a determination of a channel quality indicator (CQI) offset applied by the base station, in order to adjust a flow rate of transmissions received at the UE from the BS, and means for transmitting the adjusted feedback to the BS.

Aspects generally include methods, apparatus, systems, computer program products, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

DETAILED DESCRIPTION

Figure 1:
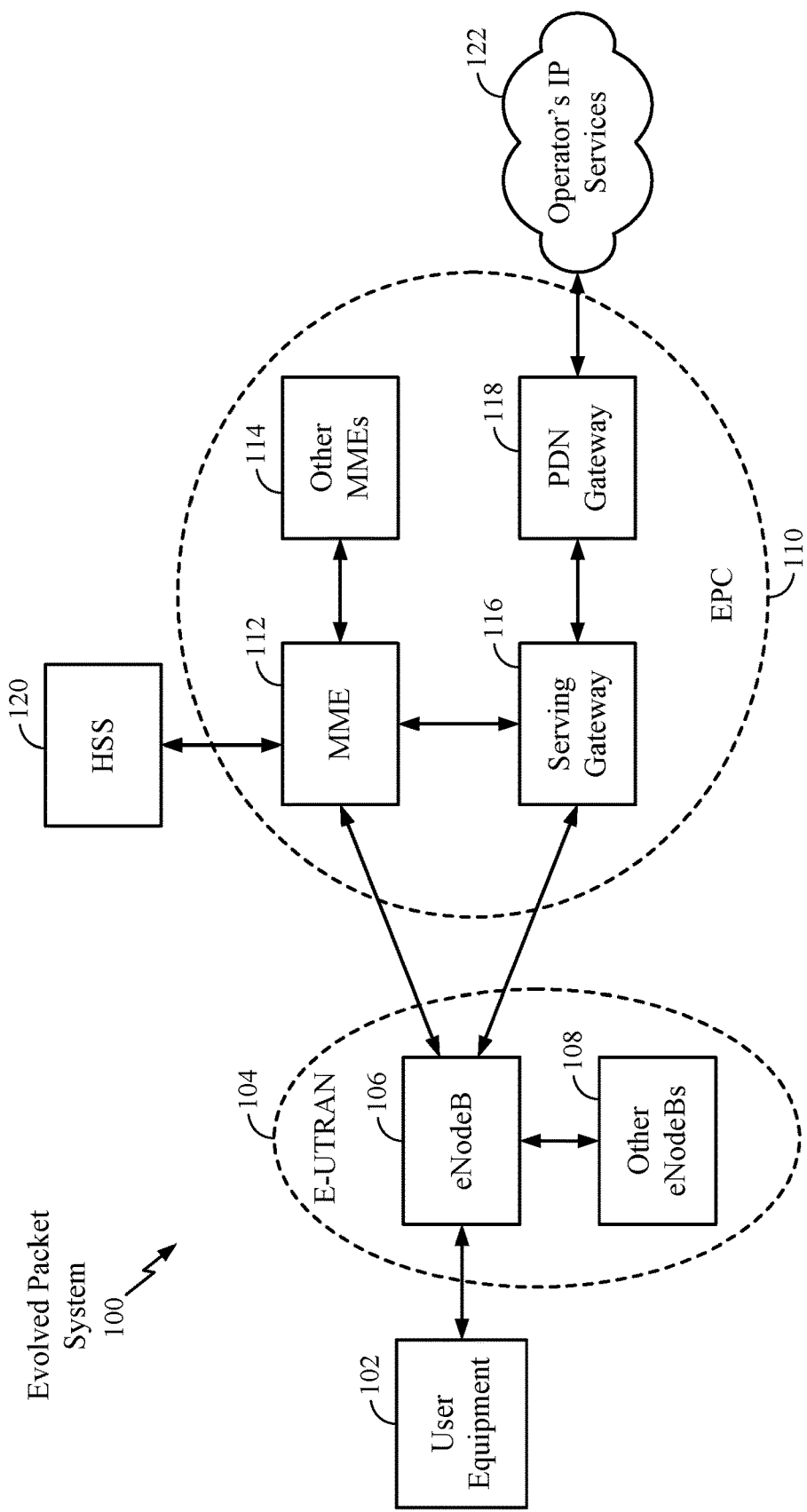
FIG. 1 is a diagram illustrating an example of a network architecture, in accordance with certain aspects of the disclosure.

A mobile station (e.g., UE) may generally trigger throughput control corresponding to downlink transmissions received at the UE from a base station (e.g., eNB), in order to manage internal conditions and/or an overload condition at the UE including UE memory overload, bus overload, processor overload, or overheating. Generally the UE may simulate a degraded channel by indicating to the base station a lower than actually measured Channel Quality Indicator (CQI), in order to cause the base station to reduce a downlink flow rate in response to receiving the indication of degraded channel conditions. However, the reduced flow rate may reduce the error rate of the downlink channel resulting in more transport blocks (TBs) being received correctly at the UE, and more positive acknowledgement (ACK) messages as opposed to negative acknowledgement messages (NACKs) being transmitted by the UE. This may cause the base station to increase the downlink flow rate by adjusting the reported CQI to a higher value, thus neutralizing the lower CQI reported by the UE.

Certain aspects of the present disclosure discuss techniques by which the UE may effectively adjust downlink flow rate in order to achieve a desired downlink throughput at the UE. In certain aspects, the UE may generate a proposal to adjust feedback provided to a base station in response to a trigger condition that is based on at least one of UE processor usage, UE memory usage, UE temperature, or UE bus usage. The UE may adjust the feedback based on the proposal and at least one additional condition including whether a transport block was correctly received, before transmission to the base station. As discussed in aspects of the present disclosure, adjusting the feedback may include NACK overriding HARQ feedback of one or more transport blocks received at the UE, transmitting a CQI that is lower than an actually measured CQI, or a combination thereof. In an aspect, the UE may NACK override the HARQ feedback of a TB, if the TB is received correctly and if the proposal indicates NACK overriding. In an aspect, the UE may adjust the feedback such that a CQI offset, applied by the base station to adjust the reported CQI, is neutralized.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an example network architecture, such as, an LTE network architecture of an Evolved Packet System (EPS) 100 in which aspects of the present disclosure may be practiced. In certain aspects, UE 102 may generate a proposal to adjust feedback provided to a base station (e.g., eNB 106) in response to a trigger condition. As noted above, the trigger condition may be based on one or more of UE processor usage, UE memory usage, UE temperature, or UE bus usage. The UE 102 may adjust the feedback based on the proposal and at least one additional condition before transmission to the eNB 106. In an aspect, the UE 102 may adjust the feedback by NACK overriding HARQ feedback of one or more transport blocks received at the UE 102, by transmitting a CQI that is lower than an actually measured CQI, or a combination thereof. In an aspect, the UE 102 may NACK override the HARQ feedback of a TB, if the TB is received correctly at the UE 102 and if the generated proposal indicates NACK overriding. Based on the HARQ feedback sent by the UE 102, the eNB 106 may apply a CQI offset to the CQI reported by the UE to generate a shifted CQI to be used for subsequent transmissions to the UE 102. In an aspect, the UE 102 may adjust the HARQ feedback to the eNB 106 such that a CQI offset applied by the eNB 106 is counteracted and/or neutralized.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, for example. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an Si interface to the EPC 110. The EPC 110 includes, for example, a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
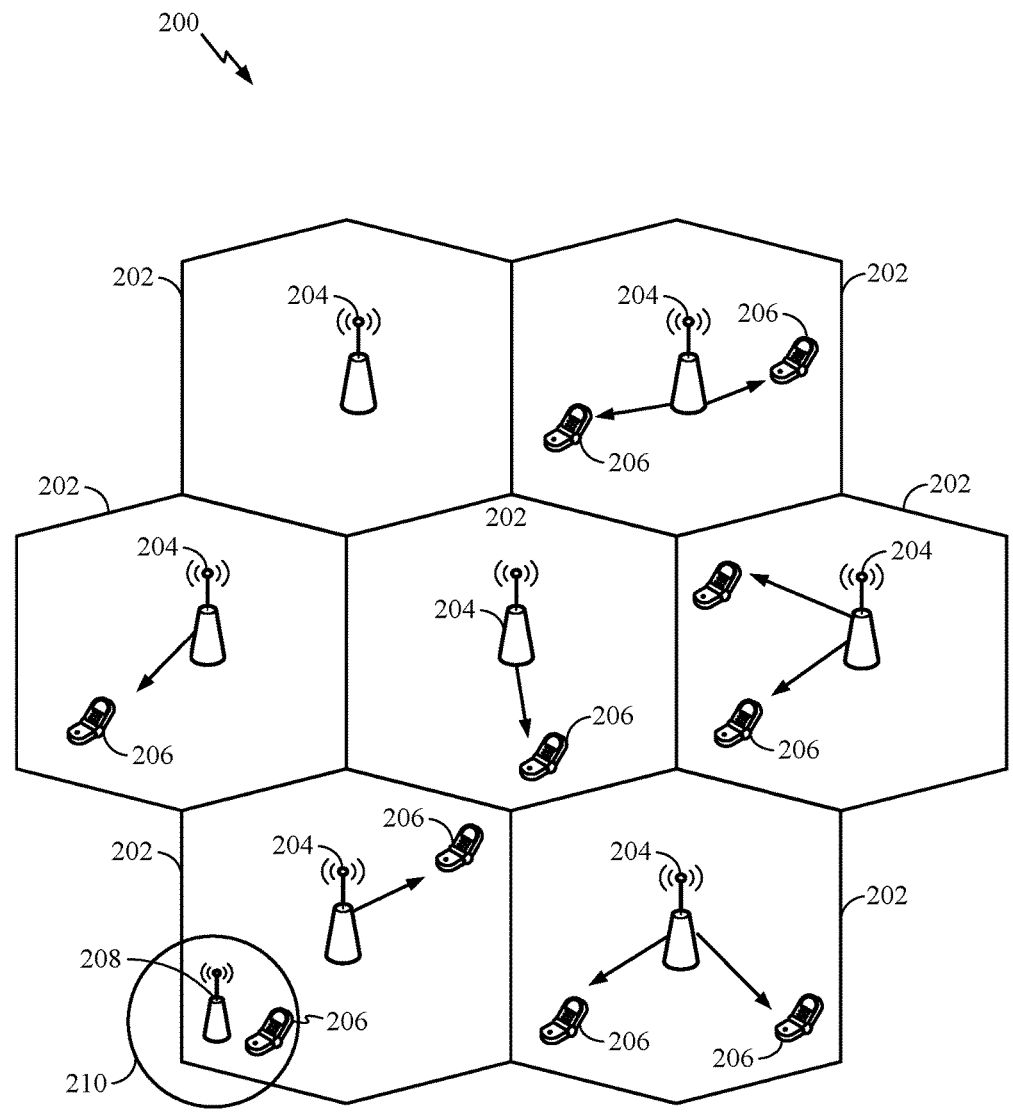
FIG. 2 is a diagram illustrating an example of an access network, in accordance with certain aspects of the disclosure.

FIG. 2 is a diagram illustrating an example of an access network 200 in an LTE network architecture in which aspects of the present disclosure may be practiced. In certain aspects, UE 206 may generate a proposal to adjust feedback provided to a base station (e.g., eNB 204) in response to a trigger condition. The UE 206 may adjust the feedback based on the proposal and at least one additional condition before transmission to the eNB 204. In an aspect, the UE 206 may adjust the feedback by NACK overriding HARQ feedback of one or more transport blocks received at the UE 206, by transmitting a CQI that is lower than an actually measured CQI, or a combination thereof.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the downlink (DL) and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
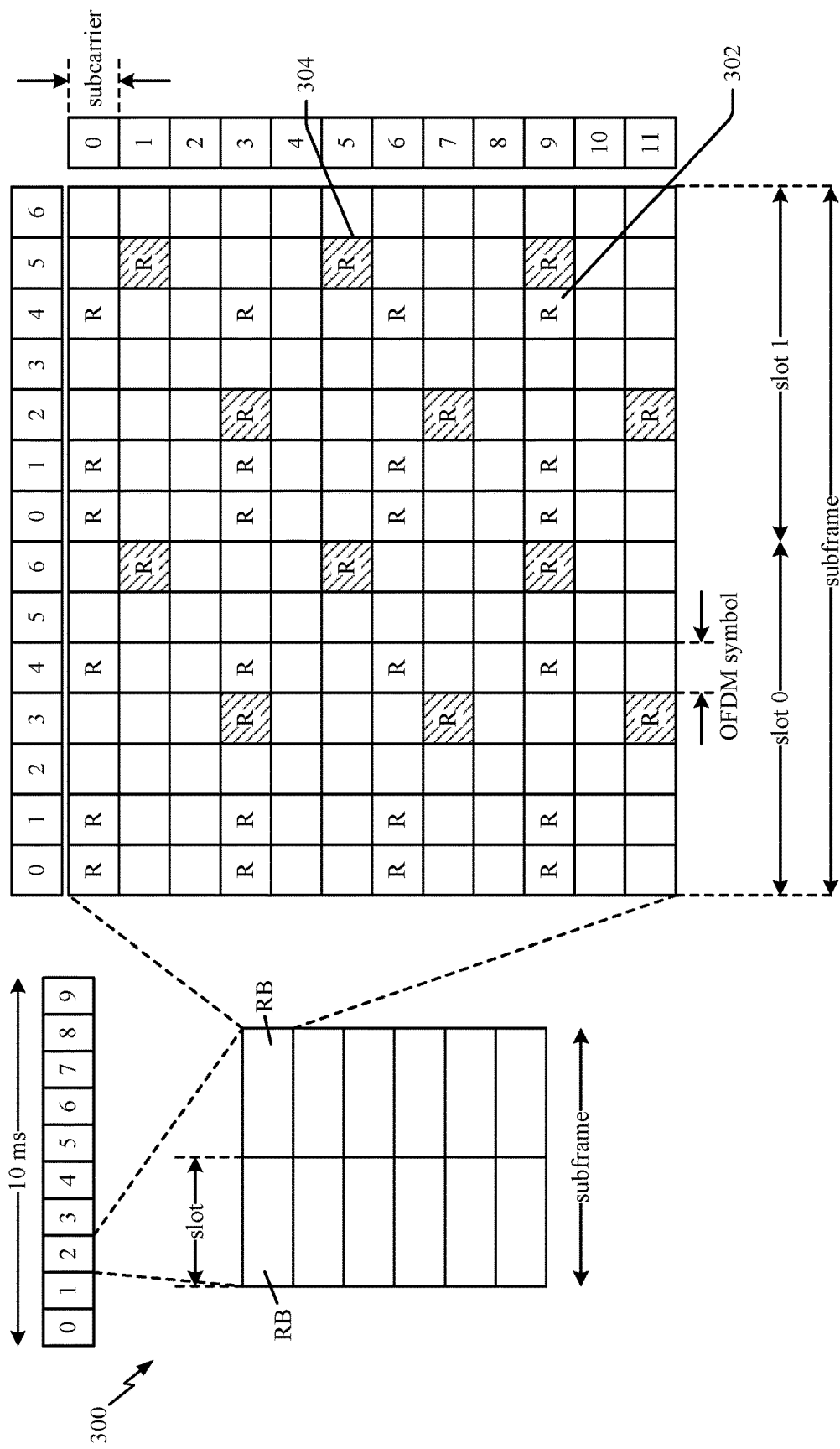
FIG. 3 is a diagram illustrating an example of a DL frame structure in LTE, in accordance with certain aspects of the disclosure.

FIG. 3 is a diagram 300 illustrating an example of a DL frame structure in LTE, in accordance with certain aspects of the disclosure. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
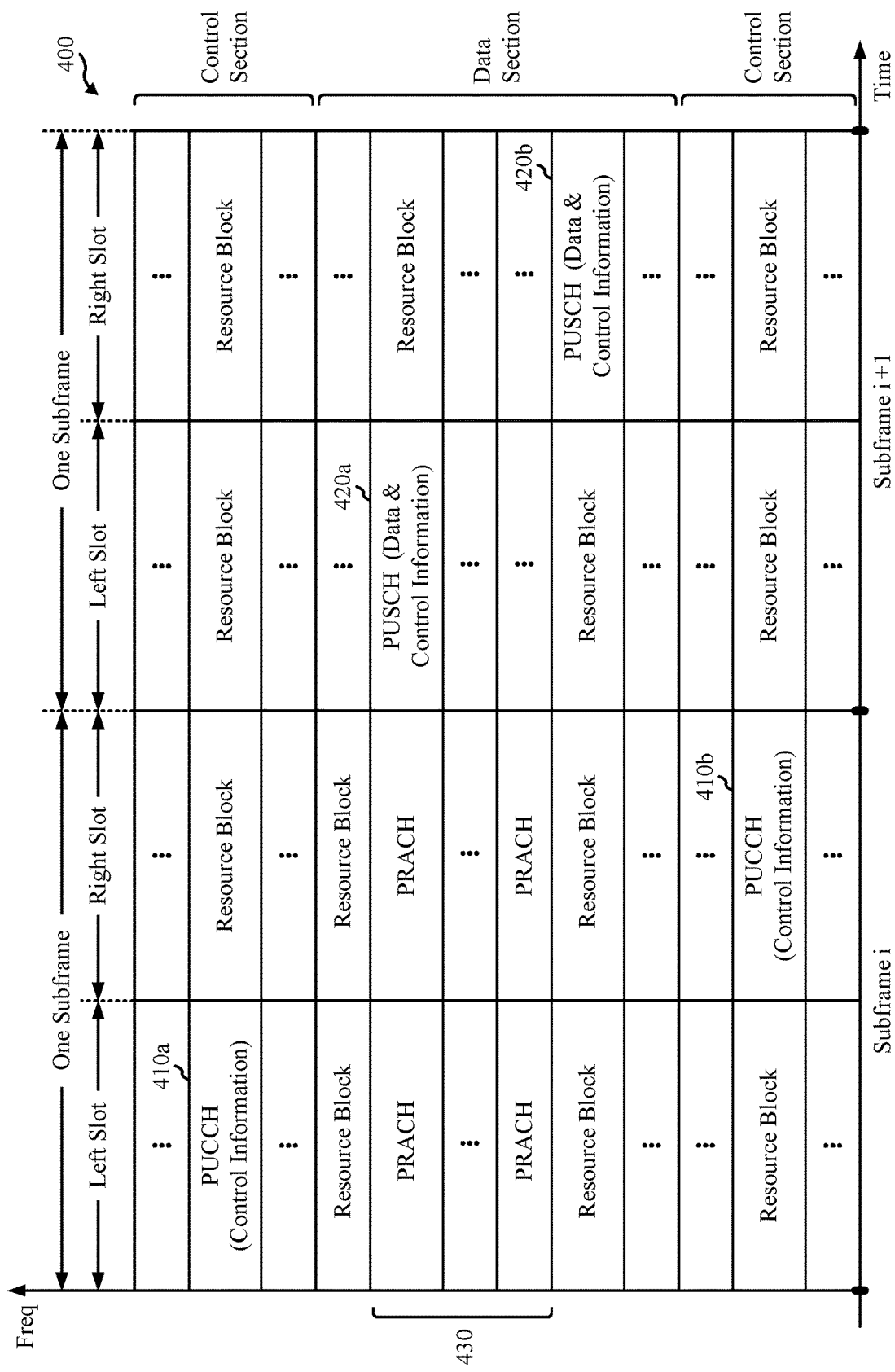
FIG. 4 is a diagram illustrating an example of an UL frame structure in LTE, in accordance with certain aspects of the disclosure.

FIG. 4 is a diagram 400 illustrating an example of an UL frame structure in LTE, in accordance with certain aspects of the disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
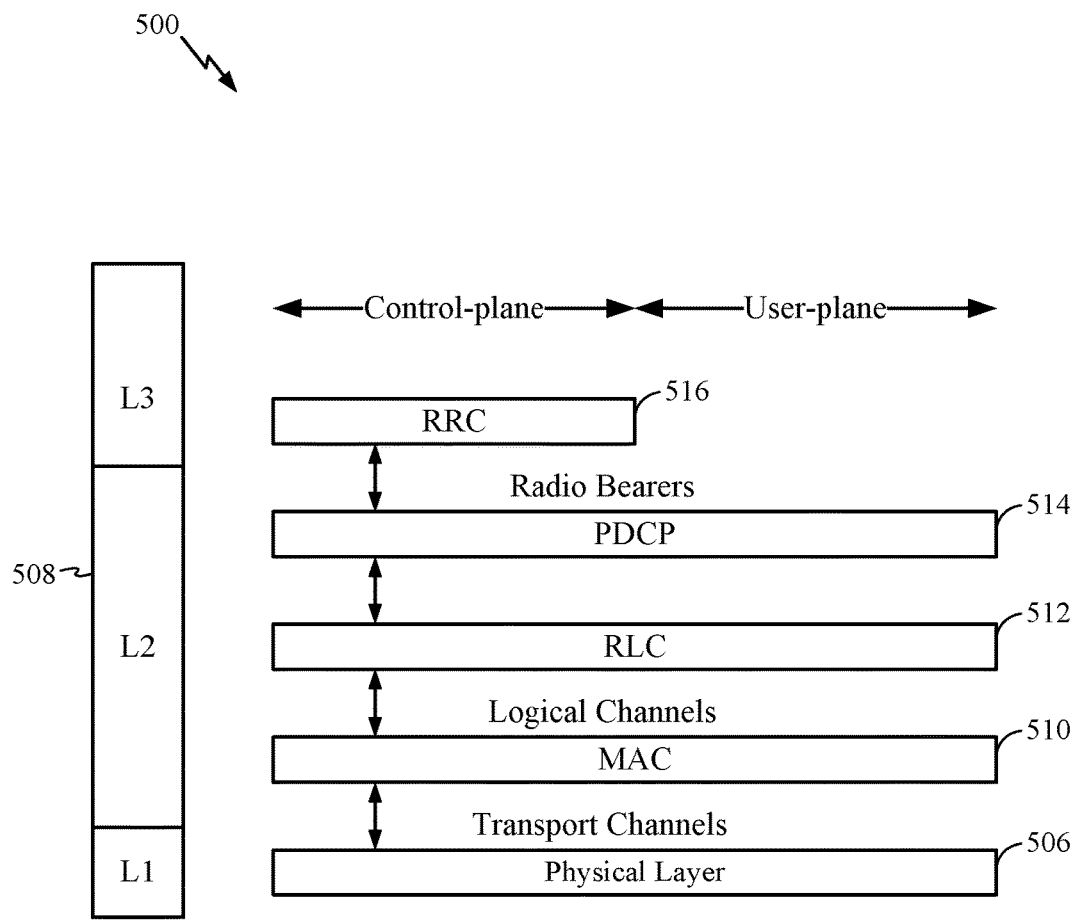
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE, in accordance with certain aspects of the disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
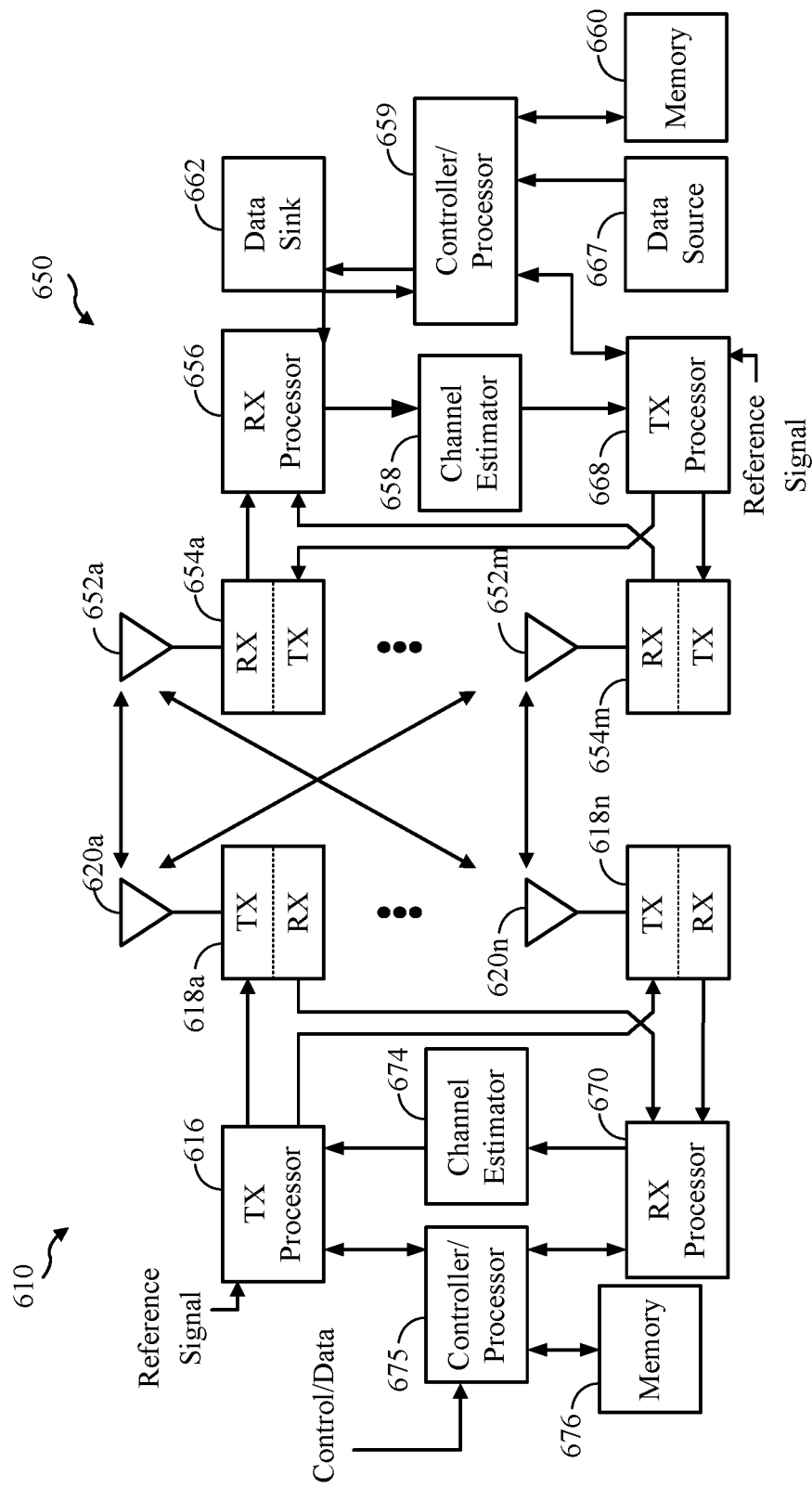
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced. In certain aspects, UE 650 may generate a proposal to adjust feedback provided to the eNB 610 in response to a trigger condition. As noted above, the trigger condition may be based on one or more of UE processor usage (e.g., one or more of controller/processor 659 and RX processor 656), UE memory usage (e.g. memory 660), UE temperature, or UE bus usage. The UE 650 may adjust the feedback based on the proposal and at least one additional condition before transmission to the eNB 610. In an aspect, the UE 650 may adjust the feedback by having a NACK override HARQ feedback associated with one or more transport blocks received at the UE 650, by transmitting a CQI that is lower than an actually measured CQI, or a combination thereof. In an aspect, the UE 650 may NACK override the HARQ feedback of a TB, if the TB is received correctly at the UE 650 and if the generated proposal indicates NACK overriding.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620a-n via a separate transmitter TX 618a-n. Each transmitter TX 618 modulates an RF carrier with a respective spatial stream for transmission.

At the UE 650, each receiver RX of transceiver TX/RX 654a-m receives a signal through its respective antenna 652a-m. Each receiver RX of transceiver TX/RX 654 recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using a positive acknowledgement (ACK) message and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters TX of transceivers TX/RX 654*a-m*. Each transmitter TX of transceiver TX/RX 654 modulates an RF carrier with a respective spatial stream for transmission.

The UL transmission is processed at the eNB 610 in a manner similar to that described in connection with the receiver function at the UE 650. Each receiver RX of transceiver TX/RX 618 receives a signal through its respective antenna 620. Each receiver RX of transceiver TX/RX 618 recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using a positive ACK message and/or NACK protocol to support HARQ operations. The controllers/processors 675, 659 may direct the operation at the eNB 610 and the UE 650, respectively.

Figure 9:
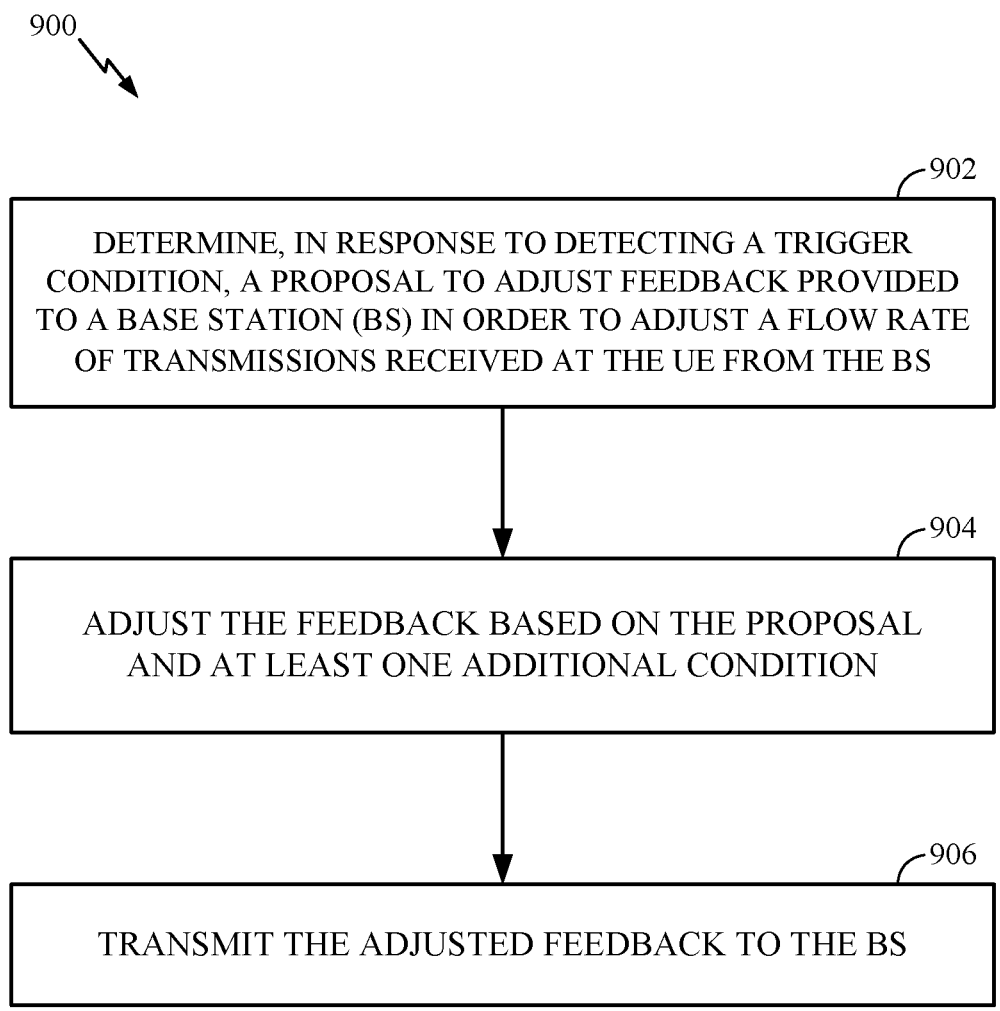
FIG. 9 illustrates example operations performed, for example, by a UE for adjusting flow rate of transmissions received at the UE, in accordance with certain aspects of the present disclosure.
Figure 12:
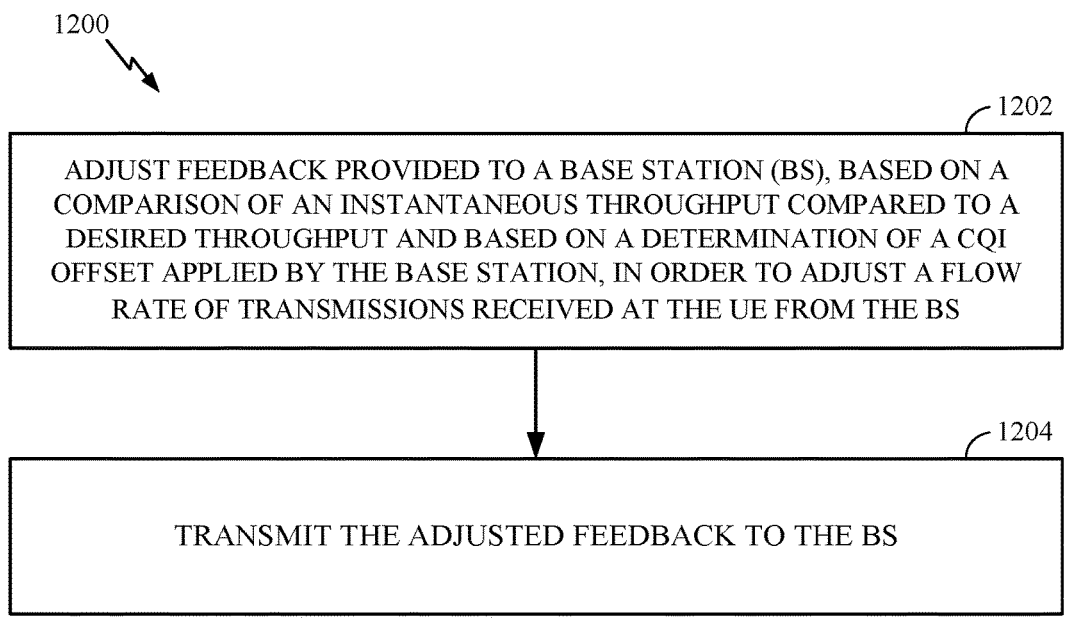
FIG. 12 illustrates example operations performed, for example, by a UE for adjusting a flow rate of transmissions received at the UE, in accordance with certain aspects of the present disclosure.

The controller/processor 659 and/or other processors, modules or components at the UE 650 may perform or direct operations for example operations 900 and 1200 in FIGS. 9 and 12 respectively, and/or other processes for the techniques described herein. For example, controller/processor 659 may be configured to determine, in response to detecting a trigger condition, a proposal to adjust feedback to the eNB 610, and adjust the feedback based on the proposal and at least one addition condition. In such aspects, controller/processor 659 and TX processor 668, may be configured to cause the transmitter TX of transceiver TX/RX 654 to transmit the adjusted feedback to the eNB 610. In certain aspects, one or more of any of the components shown in FIG. 6 may be employed to perform example operations 900 and 1200 and/or other processes for the techniques described herein. The memories 660 and 676 may store data and program codes for the UE 650 and eNB 610, respectively, accessible and executable by one or more other components of the UE 650 and the eNB 610.

Example Techniques for Adjusting Flow Rate of Transmissions Received at a Device A mobile station (e.g., UE) may trigger throughput control corresponding to downlink (DL) transmissions received at the UE, in order to manage internal conditions and/or an overload condition at the UE. For example, such a trigger may be based on availability of processing resources.

For example, when a camera on a UE (e.g., mobile phone) is active, UE bus bandwidth is highly occupied (e.g., due to high data rate of transmissions from the camera to a UE processor), and the bus may not be able to concurrently or simultaneously support high data throughput corresponding to downlink data received at the UE (e.g., LTE data from UE modem to the UE processor). In such a case the throughput corresponding to the downlink data rate received at the UE may have to be reduced in order for the UE to be able to continue uninterrupted camera operation. Other overload conditions that may trigger a throughput control at the UE may include but are not limited to a central processing unit (CPU) overload, memory overload, and overheating of one or more UE components.

Generally, the UE may simulate a degraded channel in order to cause a base station (e.g, eNB) to lower a DL transmission rate to the UE, as the base station generally does in response to receiving an indication of bad channel conditions from the UE. The UE may simulate a degraded channel by transmitting a channel quality indicator (CQI) to the eNB that is lower than an actually measured CQI at the UE. An eNB generally derives a transport block size and/or Modulation and Coding Scheme (MCS) based on a received CQI. For example, in the LTE/-A standard, CQI index equal to one may correspond to Quadrature phase shift keying (QPSK) and code rate of 78×1024, and a CQI index equal to seven may correspond to 16 QAM (Quadrature Amplitude Modulation) and code rate of 378×1024. Thus, a lower CQI reported by the UE may translate to a lower MCS selected at the eNB for DL transmissions to the UE.

One problem with the CQI-based DL flow control is that some operators also adjust the downlink rate based on a loss rate measured on the downlink. Lowering the CQI by the UE for flow control may result in a reduced loss rate on the HARQ channels. In response, the eNB may adjust the CQI that is received from the UE by adding an offset to the received CQI. This is referred to as Outer Loop Link Adaption (OLLA) at the base station. This offset, in effect may cancel the attempted flow control by the UE and cause the DL rate to increase again.

Figure 7:
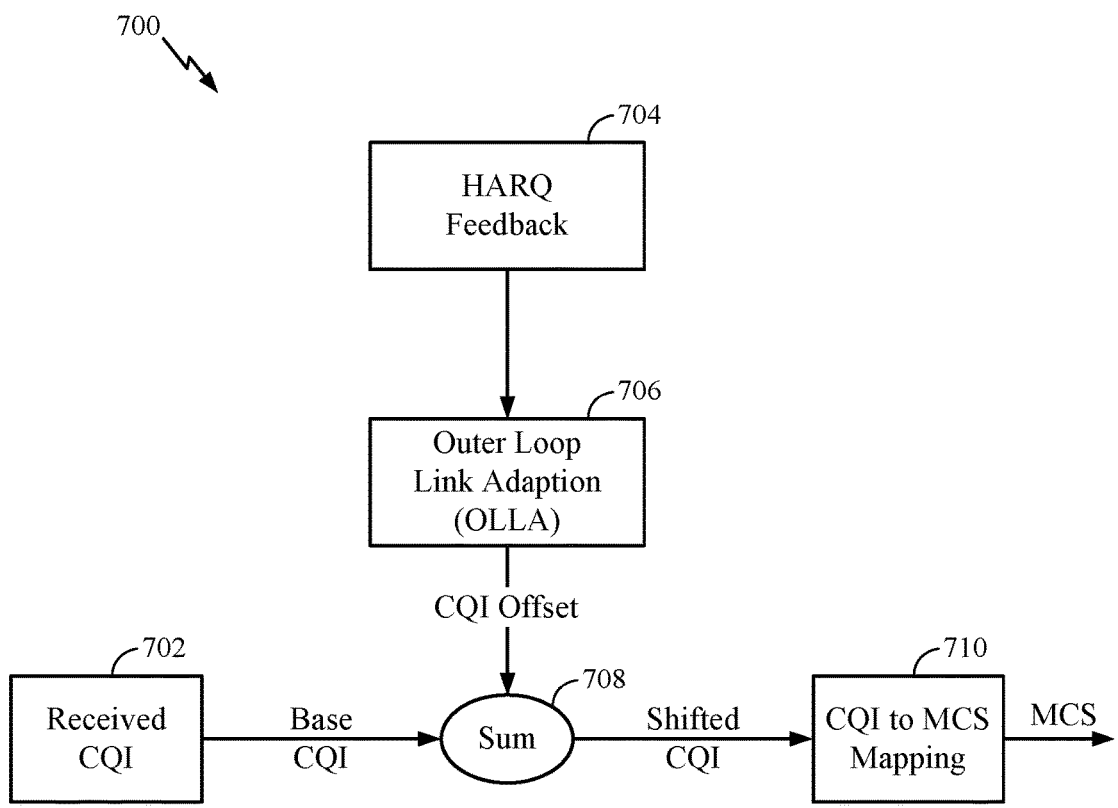
FIG. 7 illustrates an example Outer Loop Link Adaption (OLLA) at an eNB, in accordance with certain aspects of the present disclosure.

FIG. 7 illustrates an example Outer Loop Link Adaption (OLLA) 700 at an eNB (e.g., eNB 610 shown in FIG. 6), in accordance with certain aspects of the present disclosure.

At 702, the eNB 610 receives a base CQI measured and reported by a UE (e.g., UE 650 of FIG. 6) indicating the quality of the downlink channel as seen by the UE 650. The eNB 610 generally configures the UE 650 to report the UE 650 measured CQI at predefined time instants. At 704, the eNB 610 may receive HARQ feedback corresponding to DL data transmitted to the UE 650. At 706, as part of the OLLA, the eNB 610 may generate a CQI offset, for example, based on the HARQ feedback from the UE 650 and optionally based on the received base CQI.

The CQI offset is generally a positive value if the HARQ feedback is a positive ACK message indicating that the data to which the HARQ feedback corresponds to was received correctly at the UE 650. On the other hand the CQI offset is generally a negative value if the HARQ feedback is NACK (negative acknowledgement message) indicating that the data was not received correctly at the UE.

At 708, the eNB 610 adds the received base CQI value and the internally generated CQI offset value to determine a shifted CQI value. For example, if the received CQI value is Q and the eNB 610 receives a positive HARQ ACK message, the shifted CQI value will be Q+CQI offset. On the other hand, if the eNB 610 receives a HARQ NACK, the shifted CQI value will be Q−CQI offset. At 710, the eNB 610 selects an MCS based on the shifted CQI value, which may then be forwarded to transmission processing circuitry at the eNB 610 for use in transmitting data to the UE 650.

As may be appreciated from the above discussion, a positive HARQ ACK message may result in a shifted CQI value that is higher than the received CQI value, resulting in a higher MCS being selected which in turn may result in a higher DL flow rate and corresponding throughput to the UE 650. On the other hand, a HARQ NACK may result in a shifted CQI value that is lower than the received CQI value at the eNB 610, resulting in a lower MCS being selected which in turn leads to a lower DL flow rate and corresponding throughput to the UE 650.

Figure 8:
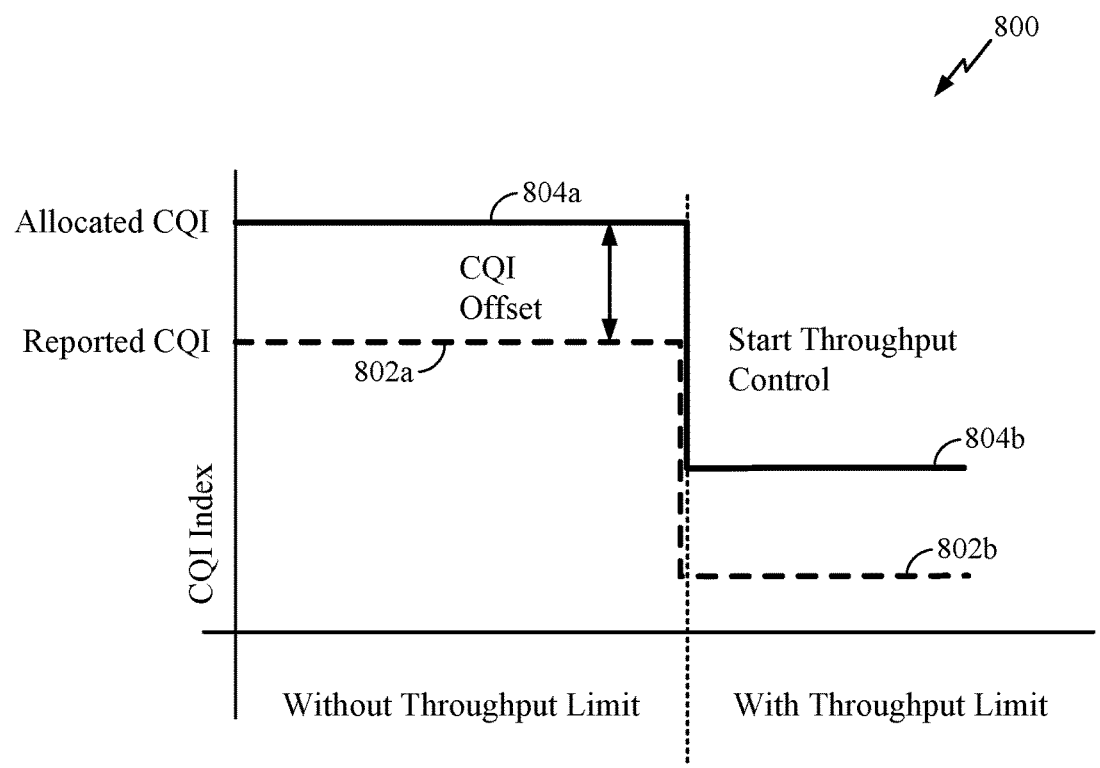
FIG. 8 illustrates an example plot showing effect of eNB-allocated CQI offset on UE throughput control, in accordance with certain aspects of the present disclosure.

FIG. 8 illustrates an example plot 800 showing effect of eNB allocated CQI offset on UE throughput control, in accordance with certain aspects of the present disclosure.

Curve 802 (including portions 802a and 802b) is based on a CQI reported by the UE 650 and curve 804 (including portions 804a and 804b) is based on the CQI allocated by the eNB 610 (e.g., shifted CQI) based on the eNB generated CQI offset. As shown in FIG. 8, when there is no throughput limit at the UE 650, the UE 650 reports an actually measured CQI 802a to the eNB. However, the allocated CQI value 804a for MCS selection at the eNB 610 may be higher than the reported CQI value 802a if the eNB 610 receives positive HARQ ACKs messages from the UE, for example, which may result in a higher throughput to the UE 650.

In a case when UE 650 is exercising throughput control (e.g., due to overload conditions at the UE 650) and there is a limit on the throughput at the UE 650, the UE 650 may indicate a degraded channel to the eNB 610 by reporting a CQI value 802b that is lower than the actually measured CQI value, as shown in FIG. 8, expecting that the eNB 610 will reduce the DL flow rate corresponding to a desired throughput at the UE 650. Starting such throughput control may result in reducing DL throughput to the UE. However, such reduction may be temporary because as discussed above, the lower CQI may result in lower error rates and thus, more positive HARQ ACK messages being received at the eNB 610. This may lead to the eNB 610 allocating a higher CQI value 804b than the reported CQI 802b, which may cause DL flow rate to increase again, thus cancelling the throughput control attempted by the UE 650.

Certain aspects of the present disclosure discuss techniques by which a UE 650 may override the HARQ feedback of DL data received at the UE 650 to adjust the DL flow rate in order to achieve a desired DL throughput at the UE. In certain aspects, these techniques for overriding HARQ feedback may be used independently or in combination with techniques for reporting a degraded channel by adjusting reported CQI by the UE 650, for controlling the DL flow rate.

FIG. 9 illustrates example operations 900 performed, for example, by a UE (e.g., UE 650) for adjusting flow rate of transmissions received at the UE, in accordance with certain aspects of the present disclosure.

Operations 900 begin, at 902, by determining, in response to detecting a trigger condition, a proposal to adjust feedback provided to a base station (e.g., BS 610) in order to adjust a flow rate of transmissions received at the UE 650 from the BS 610. At 904, the UE 650 may adjust the feedback based on the proposal and at least one additional condition. In an aspect, the additional condition may include whether at least one transport block is received correctly at the UE 650 or not. At 906, the UE 650 may transmit the adjusted feedback to the BS 610.

In certain aspects, the techniques for throughput control by adjusting feedback to be transmitted by the UE 650, as discussed in aspects of the present disclosure may be applied based on one or more trigger conditions. In an aspect, the UE 650 applies throughput control when an instantaneous measured throughput at the UE 650 is equal to or exceeds a desired throughput threshold. In an aspect the throughput threshold is explicitly indicated to the UE 650 (e.g., by the network) or is locally generated at the UE 650, for example based on UE operational history, HARQ feedback history etc.

Additionally or separately, the UE 650 may use one or more overload conditions to trigger the throughput control. For example, the overload conditions may be associated with but are not limited to processor usage, memory usage, UE temperature, and/or bus usage. In an aspect, the UE 650 maintains a threshold value for each of these parameters and triggers throughput control when one or more of the parameters equals or exceeds their corresponding threshold values.

In alternative aspects, the UE 650 may also trigger throughput control when the UE 650 senses that one or more of the above overload conditions will occur (e.g., occurrence is imminent), for example, at least one of a processor near-overload, memory near-overload, near-overheating, or bus near-overload. In an aspect, the UE 650 maintains a delta value for each of the overload parameter thresholds discussed above and triggers the throughput control when one or more of the parameters reach their respective thresholds minus delta. For example, the UE triggers throughput control when the UE temperature is a few degrees below the throughput control trigger temperature. In certain aspects, the UE sensing may be deterministic and/or heuristic. For example, the UE sensing may be based on UE operational history.

In an aspect, the UE 650 monitors (e.g., continually monitors) resource usage corresponding to applications that run on the UE 650 and stores information in the memory 660 regarding which of the applications while running require throughput control. For example the UE 650 may determine that a camera application running at the UE 650 generally includes heavy resource usage.

Thus, when a camera application is launched at the UE 650, the UE 650 may start implementing techniques for throughput control described herein in preparation of a future resource overload situation, since the UE 650 knows that the camera application will use high volume of resources (e.g. bus and processor resources), and may also raise UE temperature. In this way the UE 650 may ensure that by the time the application reaches its full resource usage levels, the DL data rates received at the UE 650 have already been reduced to ease load on the UE resources in order to allow the camera application to use UE resources to the extent required for a desired or nominal performance.

In an aspect, the UE 650 monitors (e.g., continually monitors) and stores resource usage history of a particular user and implements the techniques for throughput control based on the user's usage history. For example, if a user consistently watches videos in a particular time window during a day, the UE 650 may proactively implement throughput control at the start of this time window to prepare the UE 650 for high resource usage.

Thus, the UE 650 may monitor one or more parameters, (e.g. related to resource usage at the UE 650 including at least one of UE processor usage, UE memory usage, UE temperature, or UE bus usage) and trigger one or more techniques for throughput control discussed herein in response to detecting an overload or near-overload of the one or more parameters, e.g. above a pre-configured value.

In certain aspects, the UE 650 may apply throughput control based on an observed difference between the UE reported CQI value and that associated with the eNB granted MCS index value. For example, if the UE 650 detects that the MCS index value corresponding to the received data is higher than the MCS index that maps to the reported CQI, the UE 650 may implement one or more techniques for throughput control discussed herein.

In certain aspects, as noted above a throughput control technique implementable by the UE 650 may include NACK overriding the HARQ feedback of the UE 650 (e.g., sending a NACK regardless of the actual HARQ feedback corresponding to received data at the UE). In an aspect, the UE 650 may determine a proposal regarding overriding the HARQ feedback corresponding to the received data at the UE 650 (e.g., one or more DL transport blocks) based on a comparison of the measured instantaneous throughput T_instant corresponding to transmissions received at the UE 650 and a configurable desired throughput threshold T_Desired. In certain aspects, a plurality of decision regions may be defined and a proposal to override HARQ feedback may be determined based on which of the defined decision regions a result of the comparison falls in.

Figure 10:
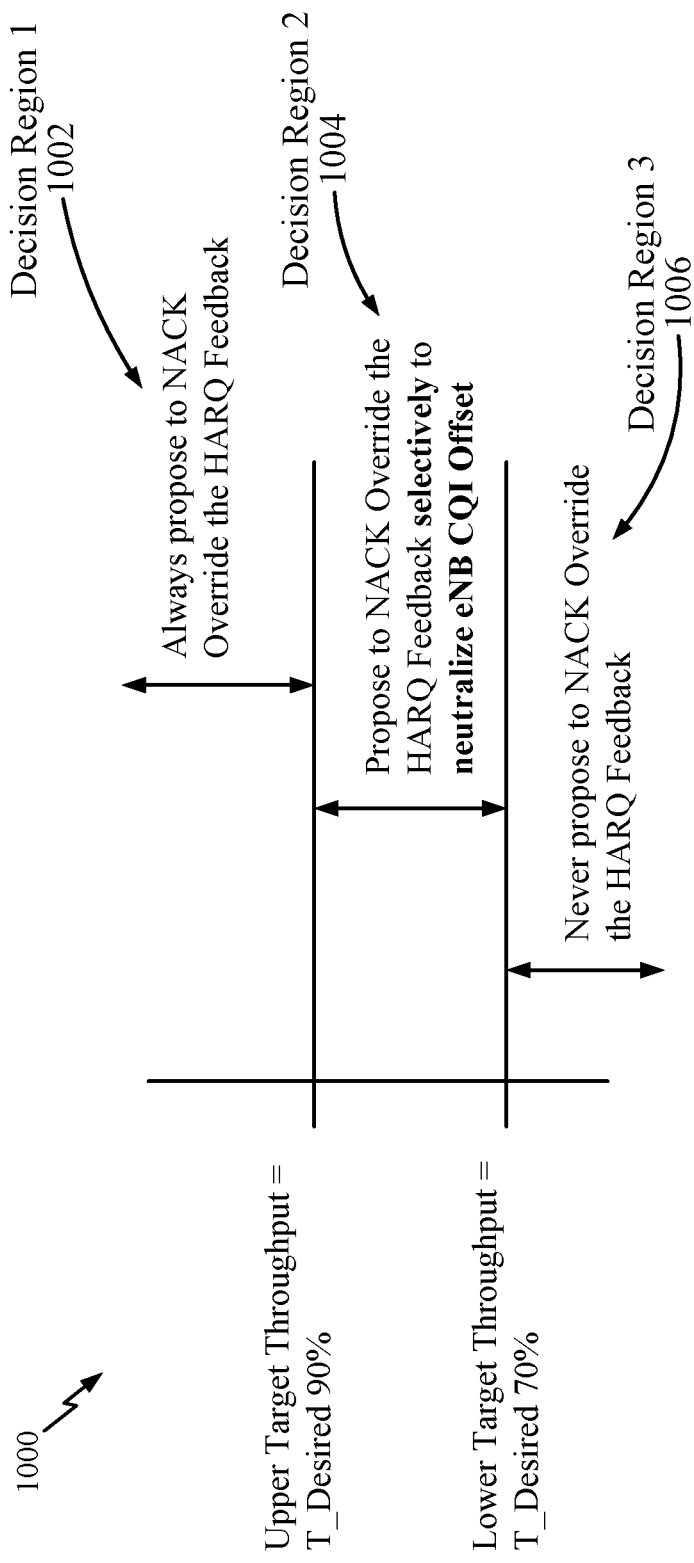
FIG. 10 illustrates three decision regions for generation of a proposal regarding overriding of HARQ feedback at a UE, in accordance with certain aspects of the present disclosure.

FIG. 10 illustrates three decision regions for generation of a proposal regarding overriding of HARQ feedback at a UE, in accordance with certain aspects of the present disclosure.

As shown in FIG. 10, if the measured T_instant of a transport block is equal to or is over 90% of T_Desired, the result of the comparison falls in Decision Region 1, 1002 where the UE 650 determines a proposal to always override the HARQ feedback of the transport block with NACK. If the measured T_instant of a transport block is between 70% and 90% of T_Desired, the result of the comparison falls in Region 2, 1004 where the UE 650 determines a proposal to selectively override the HARQ feedback with NACK. Finally, if the measured T_instant of a transport block is equal to or is below 70% of T_Desired, the result of the comparison falls in Region 3, 1006 where the UE 650 determines a proposal to never override the HARQ feedback with NACK.

In an aspect, the percentages of the T_Desired that decide whether the UE overrides HARQ feedback of one or more transport blocks is configurable.

In an aspect, when the result of comparing T_instant and T_Desired falls in Decision Region 2, the UE 650 selectively determines the proposal to NACK override the HARQ feedback such that a CQI offset used by an eNB 610 for transmissions to the UE 650 is counteracted and/or neutralized. As noted above, the eNB 610 may determine a positive CQI offset for received positive ACKs messages and/or negative CQI offset for received NACKs. A positive CQI offset may raise the flow rate to the UE 650 compensating for the attempted throughput control by the UE 650 and leading to overload conditions at the UE 650.

In some cases, the UE 650 may selectively send NACKs to the eNB 610 to cause generation of negative CQI offsets at the eNB 610 resulting in decreased DL flow rates, thereby counteracting and/or neutralizing the effect of positive CQI offsets. For example, assuming a Block Error Rate (BLER) of 10%, OLLA at the eNB 610 will generate a CQI offset of +0.01 for each received positive ACK message, and will generate a CQI offset of −0.09 for each received NACK. In order to counteract the positive offsets, the UE may generate a NACK proposal at least every 10 HARQ feedback (e.g., HARQ NACK percentage of 10%) to ensure that at least one NACK is sent for every 10 HARQ feedback messages.

In certain aspects, the UE 650 may determine an acknowledgement (ACK) message for a received transport block received at the UE 650 based on the proposal regarding overriding HARQ feedback for the transport block and additionally based on whether the transport block is received correctly at the UE or not.

Figures 11A, 11B, 11C:
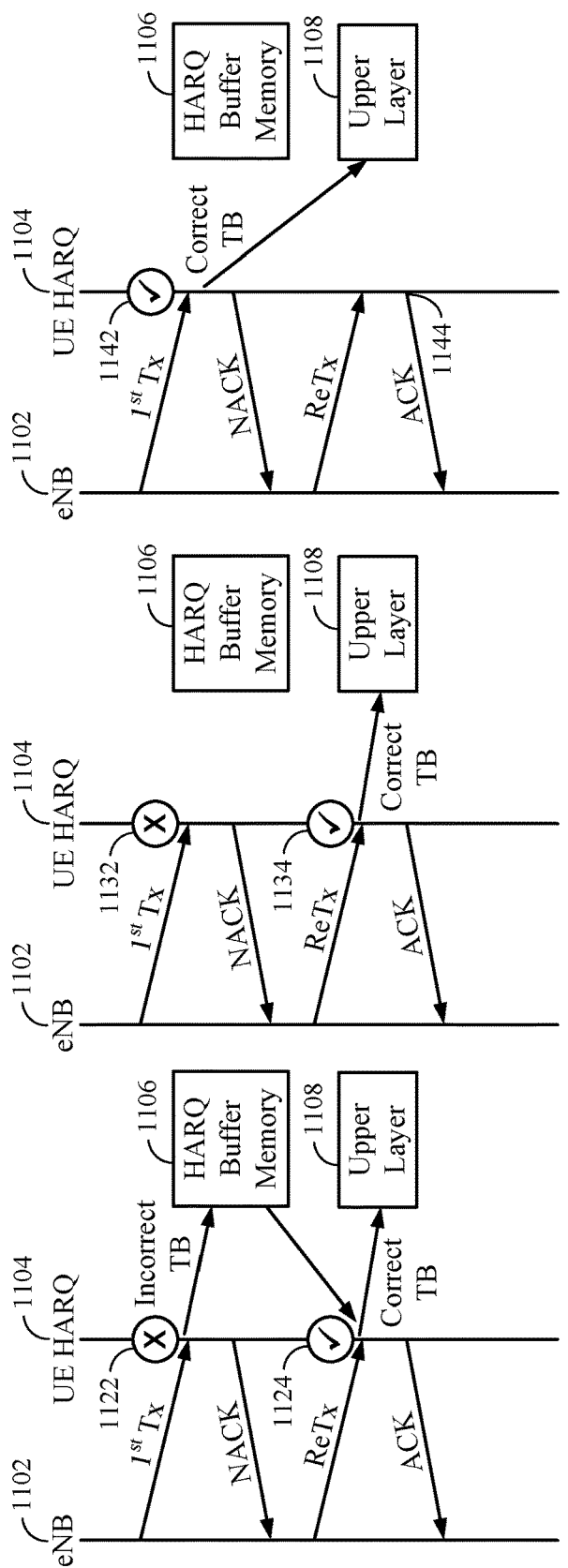
FIGS. 11*a*, 11*b*, and 11*c* illustrate generation of acknowledgement (ACK) messages for transport blocks received at a UE, in accordance with certain aspects of the present disclosure.

FIGS. 11a, 11b, and 11c illustrate generation of acknowledgement messages for transport blocks received at a UE 650, in accordance with certain aspects of the present disclosure.

FIG. 11a illustrates signal flow between eNB 1102 and UE 1104 corresponding to an incorrectly received transport block (TB) at the UE 1104 when the UE 1104 is experiencing thermal overload or near-overload and/or CPU overload or near-overload.

As shown in FIG. 11a, when a $1^{st}$ transmission of the TB is incorrectly received by the UE 1104 at 1122, the UE sends a NACK to the eNB 1102 regardless of the determined override proposal. As shown, the UE 1104 may forward the incorrectly received TB at 1122 to a HARQ buffer memory 1106 for future combining with one or more retransmissions of the TB. In response to the NACK, the UE 1104 receives a retransmission of the TB at 1124, which it is able to receive correctly. As shown, the UE combines the incorrectly received $1^{st}$ transmission of the TB stored in memory 1106 with the correctly received retransmission of the TB at 1124, and forwards the correct TB to the upper layer 1108.

FIG. 11b illustrates a signal flow between eNB 1102 and UE 1104 corresponding to an incorrectly received TB at the UE 1104 when the UE 1104 is experiencing bus overload or near-overload.

As shown in FIG. 11b, when a $1^{st}$ transmission of the TB is incorrectly received by the UE 1104 at 1132, like the case if FIG. 11a, the UE sends a NACK to the eNB 1102 regardless of the determined override proposal. However, in this case, the UE 1104 does not forward the incorrectly received TB to the HARQ buffer memory 1106, for example, in order to avoid further constraining the bus. As shown, the UE 1104 forwards the correctly received re-transmission of the TB at 1134 to the upper layer 1108 without combing with any previous transmissions of the TB.

FIG. 11c illustrates a signal flow between eNB 1102 and UE 1104 corresponding to a correctly received TB at the UE 1104. When the UE 1104 correctly receives the $1^{st}$ transmission of the TB at 1142, the UE 1104 checks the override proposal discussed above. If the override proposal is to NACK override the HARQ feedback, the UE 1104, as shown in FIG. 11c, sends a NACK to the eNB 1102 in response to the correctly received TB and forwards the correctly received TB directly to the upper layer 1108. The UE 1104 may discard the retransmission of the TB at 1144 and send an positive ACK message in response to the retransmission regardless of whether it is received correctly or not. On the other hand, if the override proposal is to not override the HARQ feedback, the UE 1104 may send a positive ACK message in response to the correctly received $1^{st}$ transmission of the TB at 1142.

In certain aspects, the UE 1104 may be configured to avoid sending a NACK for a final HARQ retransmission of a TB if it is received correctly, regardless of the proposal. Further, the UE may be configured to send a positive ACK message for a retransmission of a TB, if a previous transmission or retransmission of the TB is received correctly.

As noted above, a technique to counter the eNB outer loop (e.g., OLLA) is to selectively NACK override the HARQ feedback, such that the eNB CQI offset is counteracted and/or neutralized. In an aspect, an additional or alternative way to counter the eNB outer loop is by detecting and compensating the network CQI offset in CQI reporting. For example, if the desired DL flow rate corresponds to a CQI value of Q1 and the UE 650 determines the eNB CQI offset value of Q2, the UE 650 may report CQI=Q1–Q2, so that the eNB 610 uses CQI=(Q1–Q2)+Q2=Q1 to determine the MCS for subsequent DL transmissions to the UE 650. In an aspect, the UE 610 may determine the CQI offset Q2 based on the UE 610 reported CQI and the MCS corresponding to received DL transmissions (e.g., subsequent received DL transmissions). For example, assuming that the UE reported a CQI value of Q2a and the MCS corresponding to DL transmissions subsequent to transmitting Q2a is MCS B. The UE 650 may translate the MCS B into a corresponding CQI value Q2b, which is the CQI the eNB 610 actually used to determine the MCS B for the UE 650. The UE 650 may determine the eNB CQI offset Q2=Q2b–Q2a.

FIG. 12 illustrates example operations 1200 performed, for example, by a UE 650 for adjusting a flow rate of transmissions received at the UE 650, in accordance with certain aspects of the present disclosure.

Operations 1200 begin, at 1202, by adjusting feedback provided to a BS 610, based on a comparison of an instantaneous throughput corresponding to received downlink (DL) transmissions compared to a desired throughput, and further based on a determination of a CQI offset applied by the base station 610, in order to adjust a flow rate of transmissions received at the UE 650 from the BS 610. At 1204, the UE 650 transmits the adjusted feedback to the BS 610.

In aspects, adjusting feedback provided to a BS 610 includes simulating a degraded channel by transmitting CQIs that are lower than actually measured CQIs at the UE 650. In an aspect, as noted above, the UE 650 may generate a proposal to NACK override HARQ feedback of one or more TBs received at the UE 650 based on the comparison of the instantaneous throughput and the desired throughput.

The UE 610 may also generate a CQI offset used by the BS 610 for transmissions to the UE 650 as noted above. In an aspect, the UE 650 may adjust the HARQ feedback of one or more TBs received at the UE 650 by sending NACK feedback for the TBs based on the determined value of the CQI offset. For example, if the determined CQI offset is a positive value, the UE 650 may send NACKs for the one or more TBs in an attempt to counteract and/or neutralize the CQI offset. As noted above, the UE 650 may adjust the feedback in response to a trigger condition based on at least one of UE processor usage, UE memory usage, UE temperature, or UE bus usage. In another aspect, the UE may adjust the feedback based on HARQ history of the UE 650. In aspects, throughput includes UE processor throughput, UE memory throughput, UE bus throughput and/or DL transmissions throughput.

In certain aspects of the present disclosure, the UE 650 may use the techniques for HARQ feedback overriding discussed above in combination with techniques for simulating a degraded channel by transmitting CQIs that are lower than actually measured CQIs at the UE 650. In this case, the NACK overriding of HARQ feedback may be used to counter outer loop link adaption at the eNB 610. In certain aspects, when the throughput control trigger is removed, for example when the UE 650 comes out of an overload condition, the UE 650 may recover the throughput by gradually increasing the reported CQI over a period of time, for example via multiple CQI reports. In an aspect, if the UE 650 is in urgent need for high DL throughput when it comes out of an overload situation, the UE 650 may immediately increase the CQI to the actually measured values.

In certain aspects, the UE 650 may be configured to make sure that the HARQ NACK percentage is consistent with the UE reported CQI. In doing so, as noted above, the UE 650 may gradually reduce the reported CQI stepwise in multiple CQI reports. For example, at time t=0 ms UE 650 may report CQI=Q, at time t=T1 ms (e.g., next reporting opportunity) the UE may report CQI=Q–X, at t–T2 ms (e.g., third reporting opportunity) UE 650 may report CQI=Q–X–Y and so on until the actually measured or a desired CQI value is reached. In an aspect, the UE 650 may linearly reduce the CQI values. In an aspect the UE 650 may reduce CQI such that throughput drops linearly or non-linearly (e.g., geometrically). In an aspect the UE 650 may reduce CQI such that throughput drops geometrically to 1/n, where n=2, 3, 4. In an aspect, the UE 650 may make sure that downlink MCS has already been reduced by eNB 610 before reducing CQI again in the next CQI report. In extreme cases, as noted above, the UE 650 may decrease the CQI to the desired level in one CQI reporting.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a user equipment (UE), comprising:
   determining, in response to detecting a trigger condition, a proposal to adjust feedback provided to a base station (BS) in order to adjust a flow rate of transmissions received at the UE from the BS;
   adjusting the feedback based on the proposal and at least one additional condition, wherein adjusting the feedback comprises adjusting the feedback based on a determination, by the UE, of a channel quality indicator (CQI) offset applied by the base station; and
   transmitting the adjusted feedback to the BS.

2. The method of claim 1, wherein the trigger condition is based on overload or near-overload associated with at least one of: UE processor usage, UE memory usage, UE temperature, or UE bus usage.

3. The method of claim 2, wherein transmitting the adjusted feedback comprises transmitting at least one channel quality indicator (CQI) that is lower than an actually measured CQI.

4. The method of claim 3, further comprising gradually increasing CQI reported by the UE up to actually measured CQI, to recover the flow rate of future downlink (DL) transmissions.

5. The method of claim 1, wherein adjusting the feedback comprises:
   determining the CQI offset used by the base station based on a first CQI previously transmitted to the base station and the DL transmissions received from the base station after transmitting the first CQI; and
   determining a second CQI to be transmitted to the base station after compensating for the determined CQI offset,
   wherein transmitting the adjusted feedback comprises transmitting the second CQI to the base station.

6. The method of claim 5, wherein determining the CQI offset comprises:
   determining a modulation and coding scheme (MCS) used for the DL transmissions received from the base station;
   translating the determined MCS into an associated CQI; and
   determining the CQI offset by subtracting the first CQI from the translated CQI.

7. The method of claim 5, wherein determining the second CQI comprises determining the second CQI by subtracting the determined CQI offset from an actually measured CQI at the UE.

8. The method of claim 1, wherein the trigger condition comprises an instantaneous throughput corresponding to the received DL transmissions is equal to or is higher than a threshold based on a desired throughput.

9. The method of claim 1, wherein determining the proposal comprises determining a proposal regarding negative acknowledgement message (NACK) overriding hybrid automatic repeat request (HARD) feedback of at least one transport block received at the UE.

10. The method of claim 9, wherein adjusting the feedback comprises:
    generating an acknowledgement (ACK) message for the at least one transport block received at the UE, based on the proposal and the at least one additional condition including whether the at least one transport block is received correctly at the UE,
    wherein transmitting the adjusted feedback comprises transmitting the generated ACK message.

11. The method of claim 9, wherein determining the proposal regarding NACK overriding the HARQ feedback comprises:
    comparing an instantaneous throughput corresponding to DL transmissions to a desired throughput threshold; and
    determining the proposal based on a result of the comparison.

12. The method of claim 11, wherein the determined proposal comprises at least one of:
    a proposal to NACK override the HARQ feedback of the at least one transport block, if the instantaneous throughput equals or is above a first configurable percentage of the desired threshold;
    a proposal to not override the HARQ feedback of the at least one transport block, if the instantaneous throughput equals or is below a second configurable percentage of the desired threshold; or
    a proposal to selectively NACK override the HARQ feedback of the at least one transport block, if the instantaneous throughput is between the first and second percentages of the desired threshold.

13. The method of claim 10, wherein generating the ACK message for the at least one transport block, if the at least one transport block is received correctly, comprises:
    setting the ACK message to a NACK if the determined proposal is to NACK override the HARQ feedback; and
    setting the ACK message to a positive ACK if the determined proposal is not to override the HARQ feedback.

14. The method of claim 13, wherein when the ACK message is set to NACK, further comprising:
    forwarding the correctly received transport block to an upper layer; and transmitting a positive ACK in response to receiving a subsequent transport block retransmitted by the base station in response to receiving the ACK message transmitted by the UE.

15. The method of claim 10, wherein a percentage of HARQ NACK transmitted by the UE is consistent with a CQI reported by the UE.

16. The method of claim 10, wherein generating the ACK message comprises generating at least one NACK for every few positive ACKs to counteract a CQI offset at the base station.

17. An apparatus for wireless communications by a user equipment (UE), comprising:
   means for determining, in response to detecting a trigger condition, a proposal to adjust feedback provided to a base station (BS) in order to adjust a flow rate of transmissions received at the UE from the BS;
   means for adjusting the feedback based on the proposal and at least one additional condition, wherein adjusting the feedback comprises adjusting the feedback based on a determination, by the UE, of a channel quality indicator (CQI) offset applied by the base station; and
   means for transmitting the adjusted feedback to the BS.

18. The apparatus of claim 17, wherein the trigger condition is based on at least one of: UE processor usage, UE memory usage, UE temperature, or UE bus usage.

19. The method of claim 18, wherein the means for transmitting the adjusted feedback is configured to transmit at least one channel quality indicator (CQI) that is lower than an actually measured CQI.

20. The apparatus of claim 17, wherein the means for adjusting the feedback is configured to:
   determine the CQI offset used by the base station based on a first CQI previously transmitted to the base station and the DL transmissions received from the base station after transmitting the first CQI; and
   determine a second CQI to be transmitted to the base station after compensating for the determined CQI offset,
   wherein transmitting the adjusted feedback comprises transmitting the second CQI to the base station.

21. The apparatus of claim 20, wherein the means for determining the CQI offset is configured to:
   determine a modulation and coding scheme (MCS) used for the DL transmissions received from the base station;
   translate the determined MCS into an associated CQI; and
   determine the CQI offset by subtracting the first CQI from the translated CQI.

22. The apparatus of claim 17, wherein the means for determining the proposal is configured to determine a proposal regarding negative acknowledgement message (NACK) overriding hybrid automatic repeat request (HARD) feedback of at least one transport block received at the UE.

23. The apparatus of claim 22, wherein the means for adjusting the feedback is configured to:
   generate an acknowledgement (ACK) message for the at least one transport block received at the UE, based on the proposal and the at least one additional condition including whether the at least one transport block is received correctly at the UE,
   wherein transmitting the adjusted feedback comprises transmitting the generated ACK message.

24. The apparatus of claim 22, wherein the means for determining the proposal regarding NACK overriding the HARQ feedback is configured to:
   compare an instantaneous throughput corresponding to DL transmissions to a desired throughput threshold; and
   determine the proposal based on a result of the comparison.

25. The apparatus of claim 24, wherein the determined proposal comprises at least one of:
   a proposal to NACK override the HARQ feedback of the at least one transport block, if the instantaneous throughput equals or is above a first configurable percentage of the desired threshold;
   a proposal to not override the HARQ feedback of the at least one transport block, if the instantaneous throughput equals or is below a second configurable percentage of the desired threshold; or
   a proposal to selectively NACK override the HARQ feedback of the at least one transport block, if the instantaneous throughput is between the first and second percentages of the desired threshold.

26. The apparatus of claim 23, wherein generating the ACK message for the at least one transport block, if the at least one transport block is received correctly, comprises:
   setting the ACK message to a NACK if the determined proposal is to NACK override the HARQ feedback; and
   setting the ACK message to a positive acknowledgement ACK if the determined proposal is not to override the HARQ feedback.

27. A method for wireless communications by a user equipment (UE), comprising:
   adjusting feedback provided to a base station (BS), based on a comparison of an instantaneous throughput corresponding to received downlink (DL) transmissions compared to a desired throughput and based on a determination, by the UE, of a channel quality indicator (CQI) offset applied by the base station, in order to adjust a flow rate of transmissions received at the UE from the BS; and
   transmitting the adjusted feedback to the BS.

28. The method of claim 27, wherein adjusting feedback includes adjusting feedback in response to a trigger condition based on at least one of: UE processor usage, UE memory usage, UE temperature, or UE bus usage.

29. The method of claim 27, wherein adjusting feedback includes adjusting feedback further based on a hybrid automatic repeat request (HARQ) history.

30. An apparatus for wireless communications by a user equipment (UE), comprising:
   means for adjusting feedback provided to a base station (BS), based on a comparison of an instantaneous throughput corresponding to received downlink (DL) transmissions compared to a desired throughput and based on a determination, by the UE, of a channel quality indicator (CQI) offset applied by the base station, in order to adjust a flow rate of transmissions received at the UE from the BS; and
   means for transmitting the adjusted feedback to the BS.

* * * * *